(12) United States Patent
Bath et al.

(10) Patent No.: US 10,858,802 B2
(45) Date of Patent: Dec. 8, 2020

(54) HYDRAULIC EXCAVATION AROUND A PIPELINE BURIED UNDER SHALLOW WATER

(71) Applicant: Deepwater Corrosion Services, Inc., Houston, TX (US)

(72) Inventors: William R. Bath, Houston, TX (US); James N. Britton, Houston, TX (US)

(73) Assignee: Deepwater Corrosion Services, Inc., Houston, TX (US)

( * ) Notice: Subject to any disclaimer, the term of this patent is extended or adjusted under 35 U.S.C. 154(b) by 0 days.

(21) Appl. No.: 16/565,094

(22) Filed: Sep. 9, 2019

(65) Prior Publication Data

US 2020/0080282 A1 Mar. 12, 2020

Related U.S. Application Data

(60) Provisional application No. 62/728,899, filed on Sep. 10, 2018.

(51) Int. Cl.
| | |
|---|---|
| *F16L 1/26* | (2006.01) |
| *E02F 5/10* | (2006.01) |
| *E02F 3/92* | (2006.01) |
| *E02D 19/12* | (2006.01) |
| *E02F 5/00* | (2006.01) |

(52) U.S. Cl.
CPC ............ *E02F 3/9206* (2013.01); *E02D 19/12* (2013.01); *E02F 5/003* (2013.01); *E02F 5/006* (2013.01); *E02F 5/10* (2013.01); *E02F 5/107* (2013.01); *E02F 5/108* (2013.01); *F16L 1/26* (2013.01); *E02D 2250/003* (2013.01)

(58) Field of Classification Search
CPC . E02F 5/107; E02F 5/108; E02F 5/003; E02F 5/006; F16L 1/16; F16L 1/26
USPC .......................................................... 405/163
See application file for complete search history.

(56) References Cited

U.S. PATENT DOCUMENTS

| | | | | | |
|---|---|---|---|---|---|
| 3,505,826 | A | * | 4/1970 | Harmstorf ............... | E02F 5/125 405/163 |
| 3,747,696 | A | | 7/1973 | Wenneborg et al. | |
| 3,751,927 | A | * | 8/1973 | Perot, Jr. .................. | E02F 5/104 405/163 |
| 3,786,642 | A | * | 1/1974 | Good ....................... | E02F 5/104 405/163 |
| 4,041,717 | A | * | 8/1977 | Dressel ..................... | E02F 5/104 405/163 |
| 4,087,981 | A | * | 5/1978 | Norman .................... | E02F 5/105 37/335 |
| 4,112,695 | A | | 9/1978 | Chang et al. | |
| 4,190,382 | A | * | 2/1980 | Schmitz .................... | E02F 5/104 405/159 |

(Continued)

FOREIGN PATENT DOCUMENTS

EP 322935 * 7/1989

*Primary Examiner* — Frederick L Lagman
(74) *Attorney, Agent, or Firm* — Jonathan Pierce; Pierre Campanac; Porter Hedges LLP

(57) ABSTRACT

A hydraulic excavation apparatus may be used for providing access to a pipeline buried under shallow water or in wetland locations, for example, in order to install an electro-mechanical clamp on the pipeline. This clamp can then be used for connecting externals anodes to the pipeline, for monitoring the level of corrosion protection of the pipeline, or for any other purpose.

14 Claims, 6 Drawing Sheets

(56) References Cited

U.S. PATENT DOCUMENTS

| | | | | |
|---|---|---|---|---|
| 4,295,757 A * | 10/1981 | Gaspar | ............. | E02F 5/104 |
| | | | | 405/163 |
| 4,330,225 A * | 5/1982 | Glasgow | ............ | E02F 5/107 |
| | | | | 405/160 |
| 4,741,646 A * | 5/1988 | Hatch | ............. | E02F 5/104 |
| | | | | 37/348 |
| 4,992,000 A * | 2/1991 | Doleshal | ............. | E02F 5/104 |
| | | | | 405/158 |
| 5,765,965 A | 6/1998 | Carter, Jr. et al. | | |
| 5,970,635 A * | 10/1999 | Wilmoth | ............. | E02B 3/023 |
| | | | | 37/323 |
| 6,460,936 B1 | 10/2002 | Abramov et al. | | |
| 6,705,029 B2 * | 3/2004 | Anderson | ............ | E02F 5/105 |
| | | | | 226/170 |
| 2012/0121339 A1 * | 5/2012 | Lazzarin | ............. | E02F 5/04 |
| | | | | 405/159 |
| 2019/0071842 A1 * | 3/2019 | Bath | ............. | E02F 3/8866 |

* cited by examiner

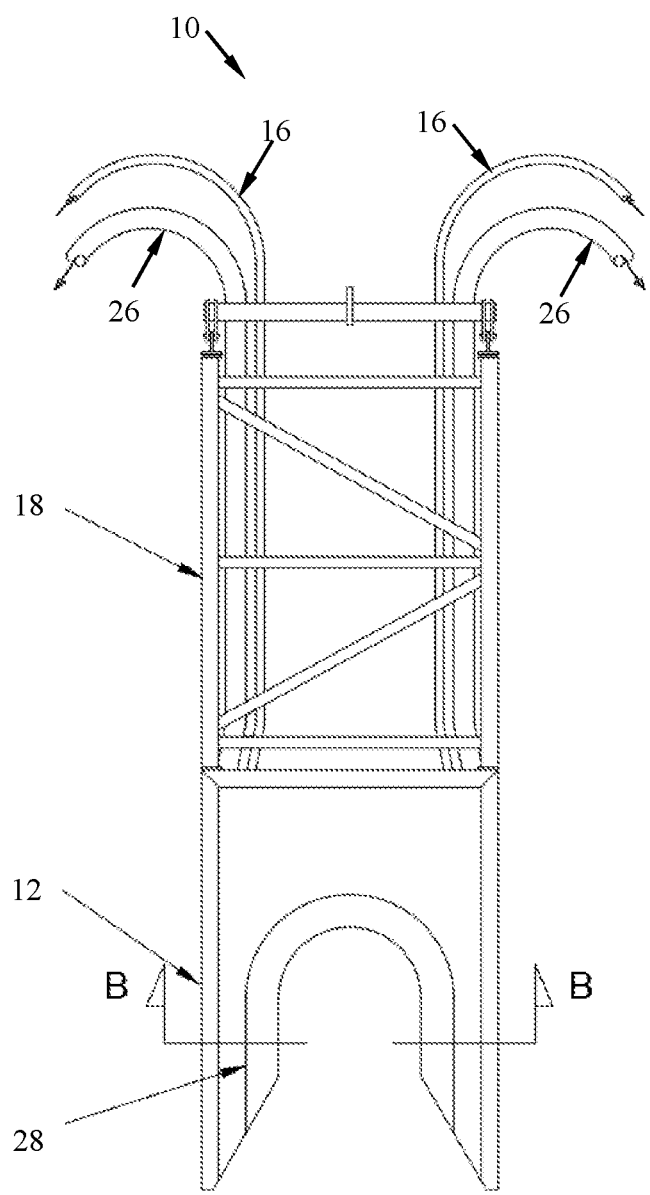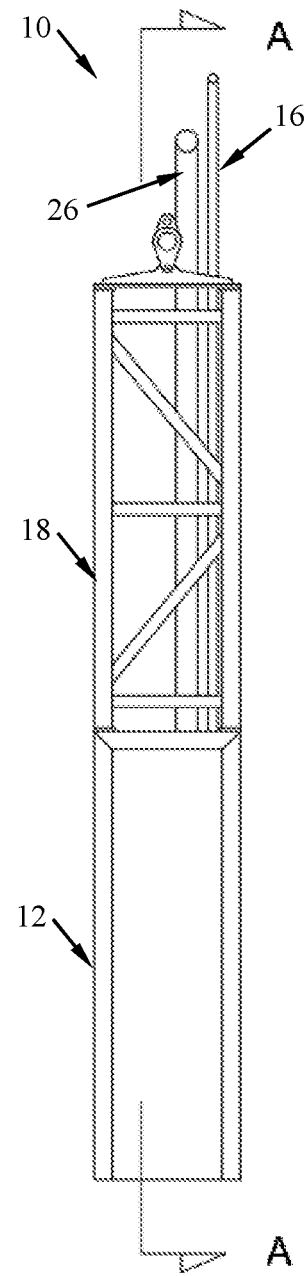
FIG. 1
FIG. 2

HYDRAULIC EXCAVATION AROUND A PIPELINE BURIED UNDER SHALLOW WATER

CROSS-REFERENCE TO RELATED APPLICATIONS

This application claims the benefit of priority to U.S. provisional application Ser. No. 62/728,899 filed on Sep. 10, 2018, the content of which is incorporated herein by reference.

BACKGROUND

The disclosure relates generally to the excavation of soil around a pipeline buried under shallow water, such as for the purpose of installing a clamp on the pipeline. In particular, the disclosure relates to apparatus and methods for dredging a hole or pit around the pipeline that utilize a combination of water jetting and hydraulic evacuation.

A large number of pipelines are located in shallow water lakes, swamps, and similar marsh areas. The pipelines are usually buried about 1.8 meters (6 feet) deep in the soil under water that may be up to 3 meters (10 feet) deep.

The pipelines are originally installed with cathodic protection against corrosion, such as by wasting away of sacrificial anodes buried with the pipelines. In some cases, after 20 or more years, the sacrificial anodes may no longer provide sufficient protection against corrosion. When this happens, it is a common practice to provide new anodes and to connect them electrically to the pipeline. The connection is commonly made with an electro-mechanical clamp that is installed on the pipeline and makes electrical contact with it. Even before the end of life of the anodes, an electro-mechanical clamp may be installed to provide an easily accessible test point above the water surface so that the level of cathodic protection may be assessed on a regular basis.

The common method for installing an electro-mechanical clamp is to dredge a large hole or pit over and around the pipeline to provide safe access for divers to install the clamp. The diameter of the hole is determined by the angle of repose of the soil, and the depth of the hole is often about 1.2 meters (4 feet) below the top of the pipeline. This depth provides space for the diver to stand beside the pipeline during the clamp installation. Visibility for the diver is generally only a few inches, which requires that the clamp installation is done by feeling with the hands, obviously a hazardous operation for the diver.

Thus, there is a continuing need in the art for apparatus and methods for excavating soil in order to create a water-filled volume or cavity around a pipeline buried under shallow water.

BRIEF SUMMARY OF THE DISCLOSURE

The disclosure describes apparatus and methods for excavating the soil around and above a pipeline buried under shallow water in order to create a water-filled volume or cavity around and above the pipeline.

The hydraulic excavation apparatus comprises an enclosure wall having an inverted-U cutout at the bottom of each of two opposite portions of the enclosure wall. The enclosure wall may have a rectangular section. A guide frame extends from the top of the enclosure wall.

The hydraulic excavation apparatus is deployed from a floating vessel such as a barge, airboat, pontoon boat or similar shallow draft vessel. The enclosure wall preferably sinks into the soil under its own weight. The hydraulic excavation apparatus uses a combination of water jetting pipes and hydraulic evacuation pipes to excavate the soil in and around the enclosure wall as the enclosure wall sinks down into the soil and lands on the pipeline. An upper portion of the guide frame may remain above the water surface. The upper portion of the guide frame may provide a visual guide to the water-filled volume or cavity around the pipeline inside the enclosure wall. The hydraulic excavation apparatus may be prevented from tipping over during this excavation operation by a retainer mounted on the floating vessel, which constrains the movement of the guide frame. This retainer may take the form of a self-erecting gantry or a rectangular bracket mounted on the front of the floating vessel. The hydraulic excavation apparatus may be lifted and recovered by winches on the gantry or by a crane mounted on the floating vessel.

After the hydraulic excavation apparatus is in place on the pipeline, an electro-mechanical clamp or similar device may be lowered in the water, may pass through the open center of the enclosure wall, may land on the pipeline. The clamp can then be operated from above the water surface by a simple reach-rod to make electrical connection with the pipeline. After the clamp is installed, the enclosure may be recovered, and the hole or pit created by the hydraulic excavation apparatus may refill by natural action.

BRIEF DESCRIPTION OF THE DRAWINGS

For a more detailed description of the embodiments of the disclosure, reference will now be made to the accompanying drawings, wherein:

FIG. 1 is a frontal view of a hydraulic excavation apparatus;

FIG. 2 is a side view of the hydraulic excavation apparatus shown in FIG. 1;

DETAILED DESCRIPTION

Figure 3:
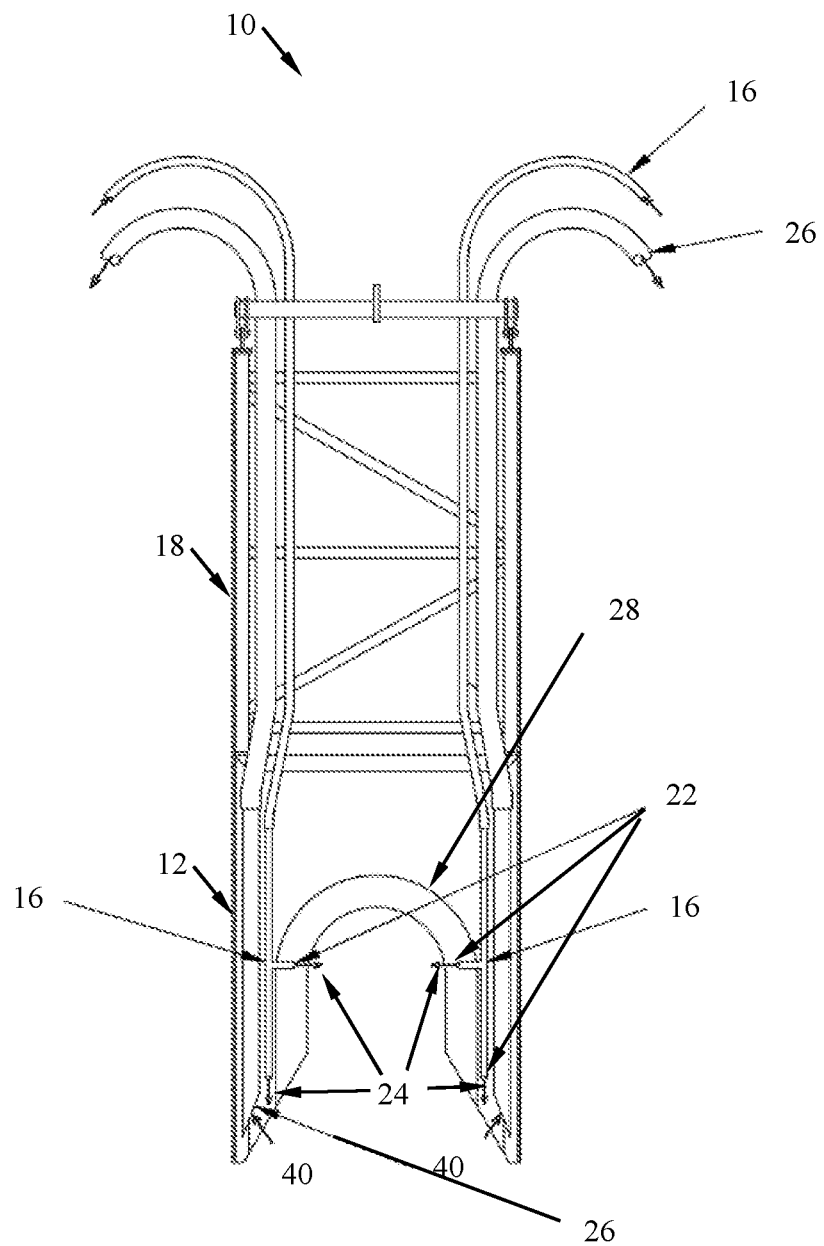
FIG. 3 is a sectional view along line AA of the hydraulic excavation apparatus shown in FIG. 2.
Figure 4:
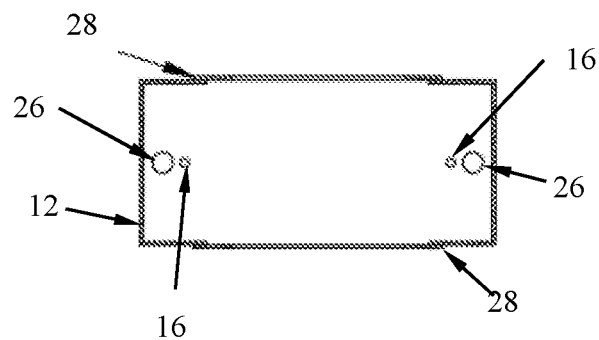
FIG. 4 is a sectional view along line BB of the hydraulic excavation apparatus shown in FIG. 1.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

The disclosure describes a hydraulic excavation apparatus that may be used for providing access to a pipeline buried under shallow water or in wetland locations, for example, in order to install an electro-mechanical clamp on the pipeline. This clamp can then be used for connecting externals anodes to the pipeline, for monitoring the level of corrosion protection of the pipeline, or for any other purpose.

Referring to FIGS. 1-4, the hydraulic excavation apparatus 10 may comprise an enclosure wall 12, which may have a rectangular section and a guide frame 18 that extends from the top of the enclosure wall 12. Preferably, the bottom and top of the enclosure wall 12 are completely open. Panels 28 are exchangeable and can be bolted or otherwise secured to the enclosure wall 12 before deployment of the hydraulic excavation apparatus 10. The panels 28 are used to reduce the amount of soil that would enter the enclosure from around the pipeline 20. Each panel 28 has an inverted-U cutout that fit closely around the pipeline 20 on which the enclosure wall 12 is to be landed. For example, the inverted-U cutout can have a diameter equal to the diameter of the pipeline 20 plus about 1.25 cm (0.5 inch). Alternatively, the bottom of the enclosure wall 12 may have an inverted-U shaped cutout designed to match the size and curvature of the pipeline 20. Intermediate sections (not shown) may be added or removed between enclosure wall 12 and guide frame 18 to increase the height of the enclosure wall 12, the height of the guide frame 18, or the heights of both the enclosure wall 12 and the guide frame 18. Accordingly, the water depth and/or the pipeline depth at which the hydraulic excavation apparatus 10 can operate can be adjusted.

The hydraulic excavation apparatus 10 also comprises water jetting pipes 16 that may be attached inside the enclosure wall 12. The water jetting pipes 16 are connected to the outlet of a pump or pumps, for example, the pressure jetting pump 30 (shown in FIGS. 5-7), which may be driven by an engine. Preferably, there is a water jetting pipe 16 on each side of the enclosure wall 12. Each water jetting pipe 16 is shown with water jet nozzles 22 to generate pressure jets. The water jet nozzles 22 can be located along or at the end of the water jetting pipes 16 so that multiple pressure jets can be generated along or at the end of any water jetting pipe 16. The pressure jets blast into the soil, loosen or break-up the soil, and stir the soil with water into fluidized soil that can be evacuated. The direction of the pressure jets is indicated with arrows 24. For example, two pressure jets point down so that a water-filled volume or cavity is created in the soil so that the enclosure wall 12 can sink into the soil. Two pressure jets point horizontally inward to blast the sides and top of the pipeline 20 as the enclosure wall 12 sinks over it. Alternatively, water jetting pipes 16 and water jet nozzles 22 may be mounted inside the enclosure wall 12 and regularly arranged all around the open end of the bottom of the enclosure wall 12. The directions of the pressure jets may point to any direction between vertical and horizontal directions.

The hydraulic excavation apparatus 10 also comprises hydraulic evacuation pipes 26 that may be attached inside the enclosure wall 12. The hydraulic evacuation pipes 26 may have a larger diameter than the water jetting pipes 16. Each hydraulic evacuation pipe 26 may include a single port 40 that is positioned near the bottom of the enclosure wall 12. These hydraulic evacuation pipes 26 are connected to the suction side of a pump or pumps, such as the dredging pump 32 (shown in FIGS. 5-7), which may be driven by an engine. Accordingly, the fluidized soil created by the pressure jets is sucked out of the enclosure wall 12 by the hydraulic evacuation pipes 26. In other words, the dredging pump 32 is used to evacuate the fluidized soil from inside the enclosure.

Figure 5:
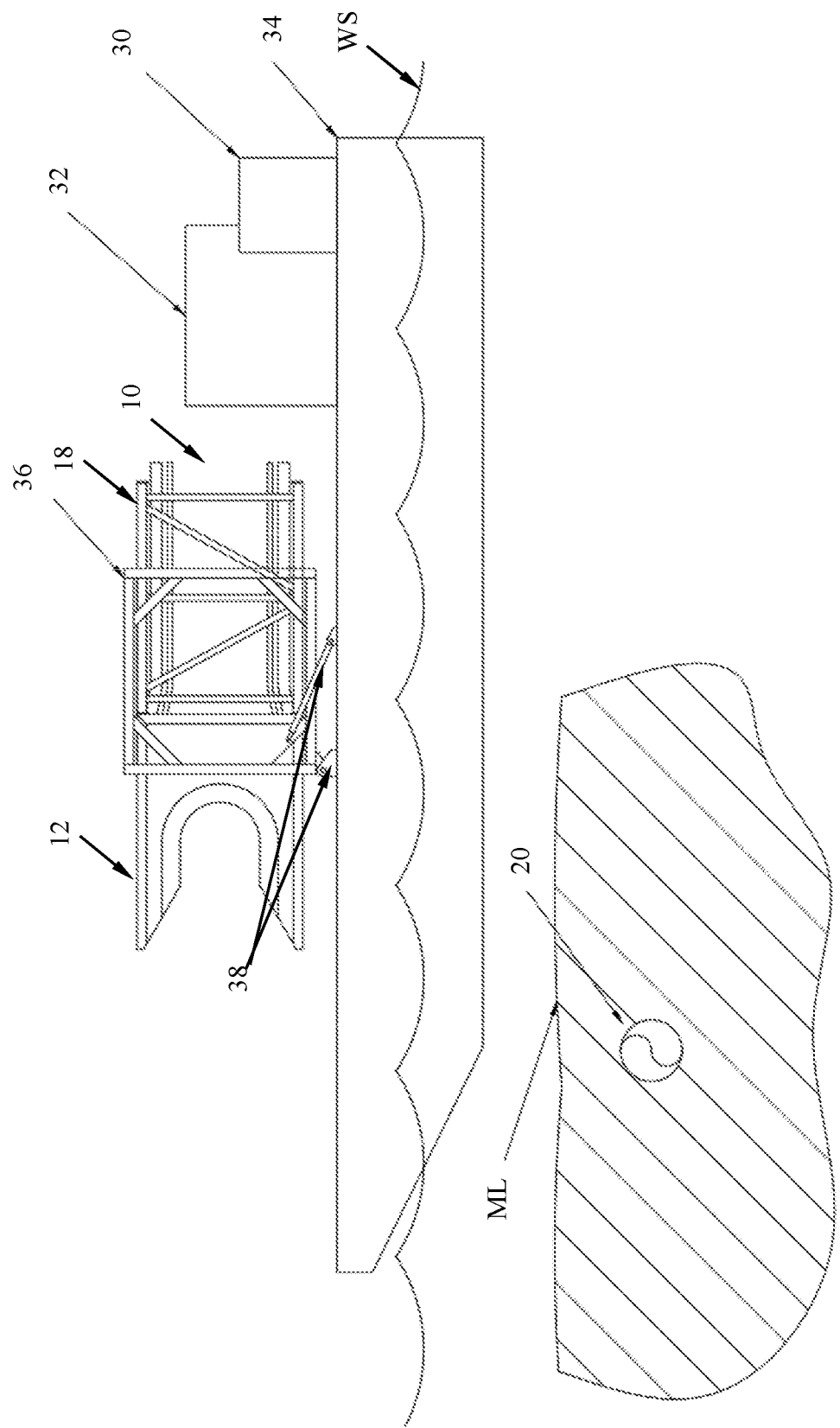
FIGS. 5, 6 and 7 illustrate a sequence of steps of a method of using the hydraulic excavation apparatus shown in FIG. 1 with a gantry and a tilting mechanism mounted on a floating vessel.

Referring to FIG. 5, the hydraulic excavation apparatus 10 may be suspended from floating vessel 34 by a gantry 36 that constrains the movement of and guides the enclosure wall 12 and/or the guide frame 18 as the hydraulic excavation apparatus 10 is lowered into the water. In one embodiment, the gantry 36 is mounted on a pontoon boat. The gantry 36 may be centered between the pontoons. The gantry 36 may be fixed in place on the floating vessel 34 or mounted on a tilting mechanism 38, which in turn may be fixed in place on the floating vessel 34. The tilting mechanism 38 is designed to move the gantry 36 between a horizontal position used during excavation operations, and a vertical position used to reduce the overall height for transport.

Figure 6:
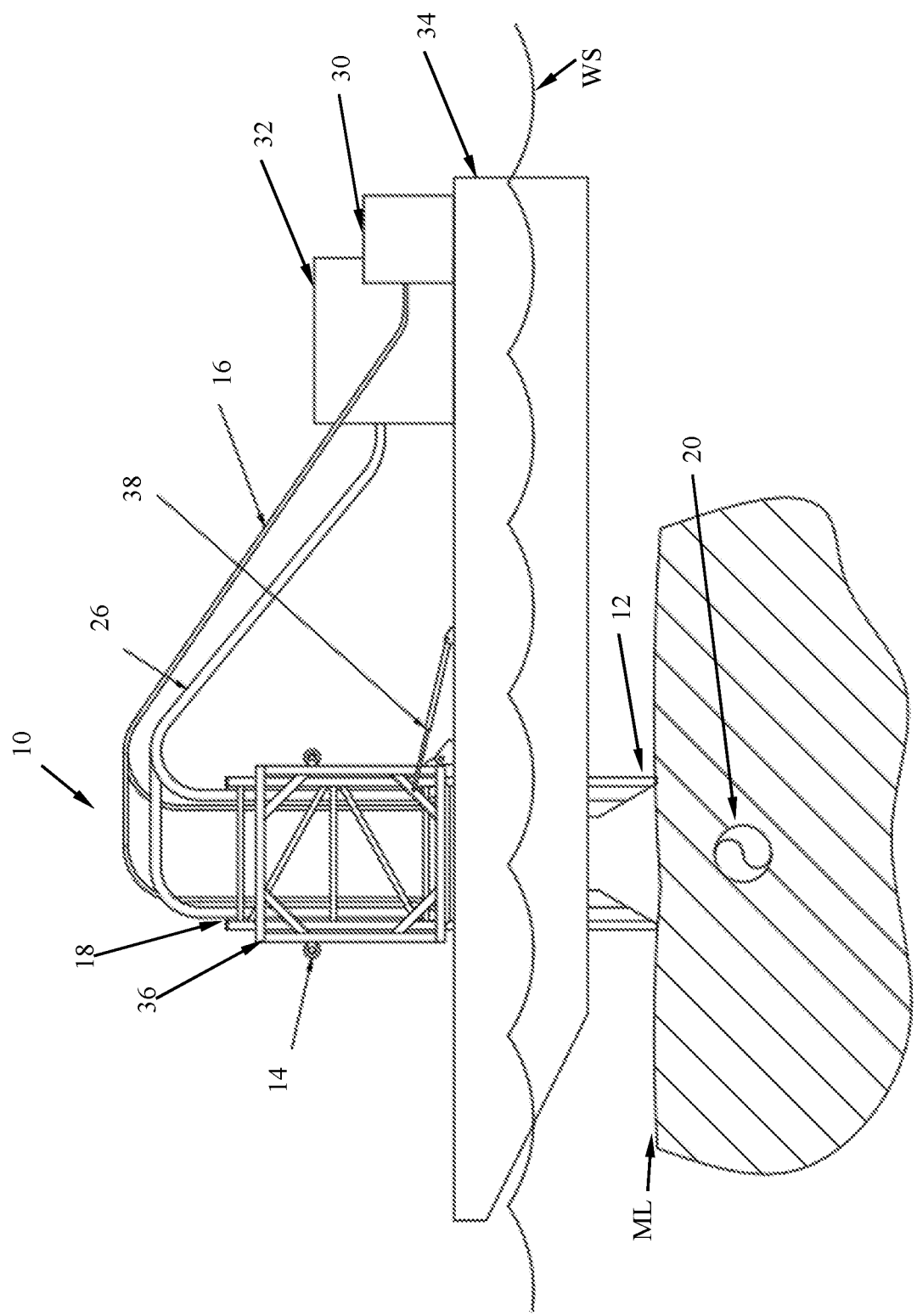

Referring to FIG. 6, the floating vessel 34 can be held in position over the pipeline 20 by posts driven into the soil by the operator before the hydraulic excavation apparatus 10 is deployed. The gantry 36 and the hydraulic excavation apparatus 10 are raised from laying down horizontally during transport by using the tilting mechanism 38.

The pressure jetting pump 30 and the dredging pump 32, provided on the deck of the floating vessel 34 are connected by hoses (also numbered 16 and 26) to the water jetting pipes 16 and to hydraulic evacuation pipes 26, respectively, to provide hydraulic jetting and hydraulic evacuation capability. The guide frame 18, which extends from the top of the enclosure wall 12, is maintained vertical by the gantry 36 during deployment. The hydraulic excavation apparatus 10 may be deployed through a rectangular hole in the deck. The hydraulic excavation apparatus 10 is lowered to the mudline ML and/or raised on a floating vessel 34 by a hoisting system 14 mounted on the gantry 36. For example, the hoisting system 14 may include a pair of manual hoists on the sides of the gantry 36. Accordingly, the hoisting system 14 allows an operator to raise and lower the hydraulic excavation apparatus 10.

Once landed on the mudline ML, the hydraulic excavation apparatus 10 uses a combination of hydraulic jetting and hydraulic evacuation to excavate the soil inside the enclosure wall 12, which also allows the enclosure wall 12 to sink into the soil until it surrounds the pipeline 20.

Figure 7:
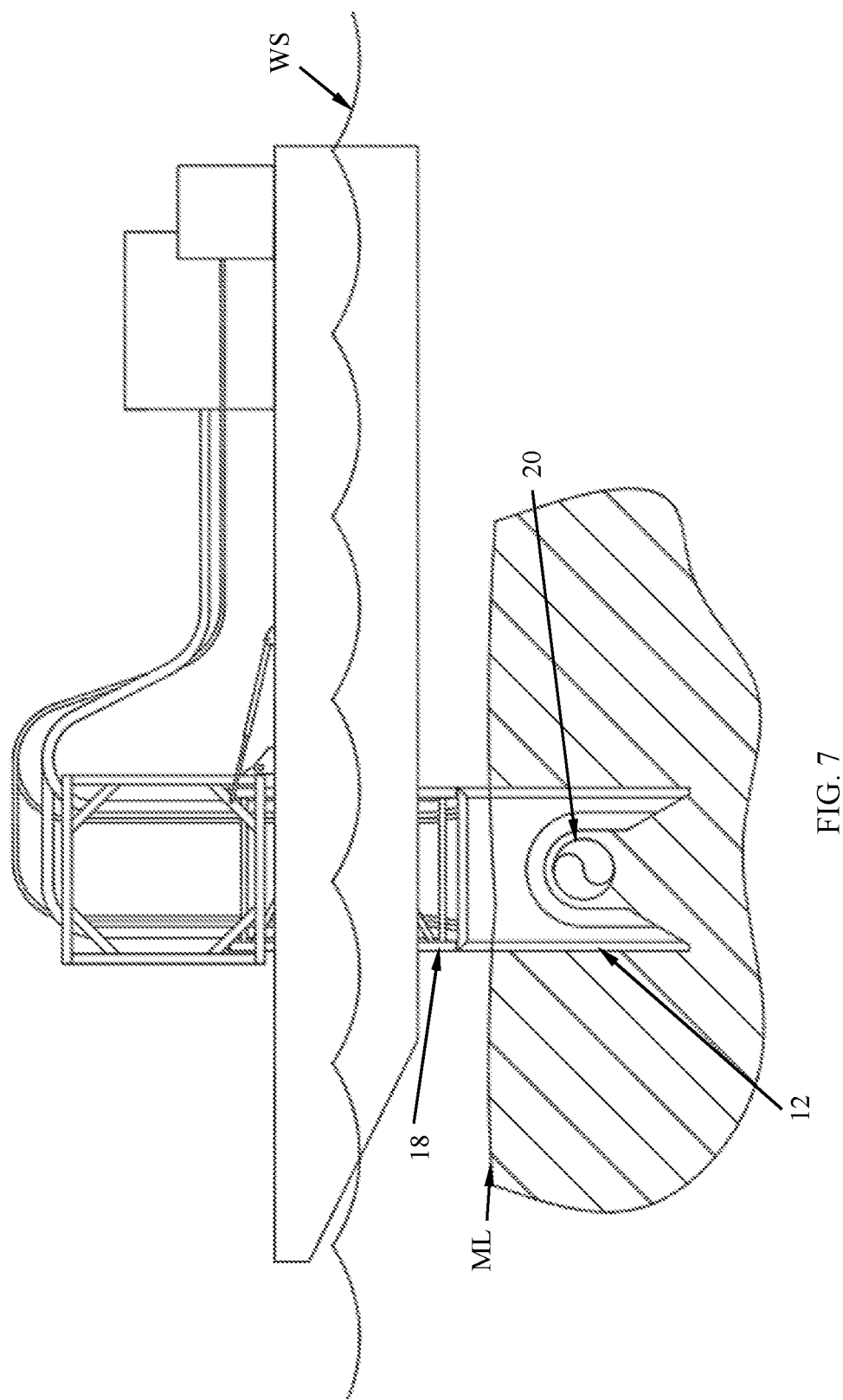

Referring to FIG. 7, when landed on the pipeline 20, the enclosure wall 12 forms a mud dam around the volume or cavity created in the soil. The top of the enclosure wall 12 is designed to extend above the mudline ML but below the water surface WS so that the enclosure is always completely flooded. Water may be continuously pumped through the water jetting pipes 16 to keep the soil from reentering inside the enclosure wall 12 while the electromechanical clamp is being installed. The inside of the enclosure may be filled with relatively clear water, because when the enclosure wall 12 is landed on the pipeline 20, it may not sink deeper, and the pressure jets may no longer be effective at loosening more soil. As such, all the soil loosened previously may enter the hydraulic evacuation pipes 26, so little or no soil may remain in the enclosure wall 12.

A water-filled volume or cavity is created around the pipeline 20 whereby the top and sides of the pipeline 20 are accessible. An electro-mechanical clamp can then be manually lowered through the open top of the enclosure wall 12 and easily installed on the pipeline 20. The guide frame 18 may provide visual guidance to the operators during installation of the electro-mechanical clamp.

Figure 8:
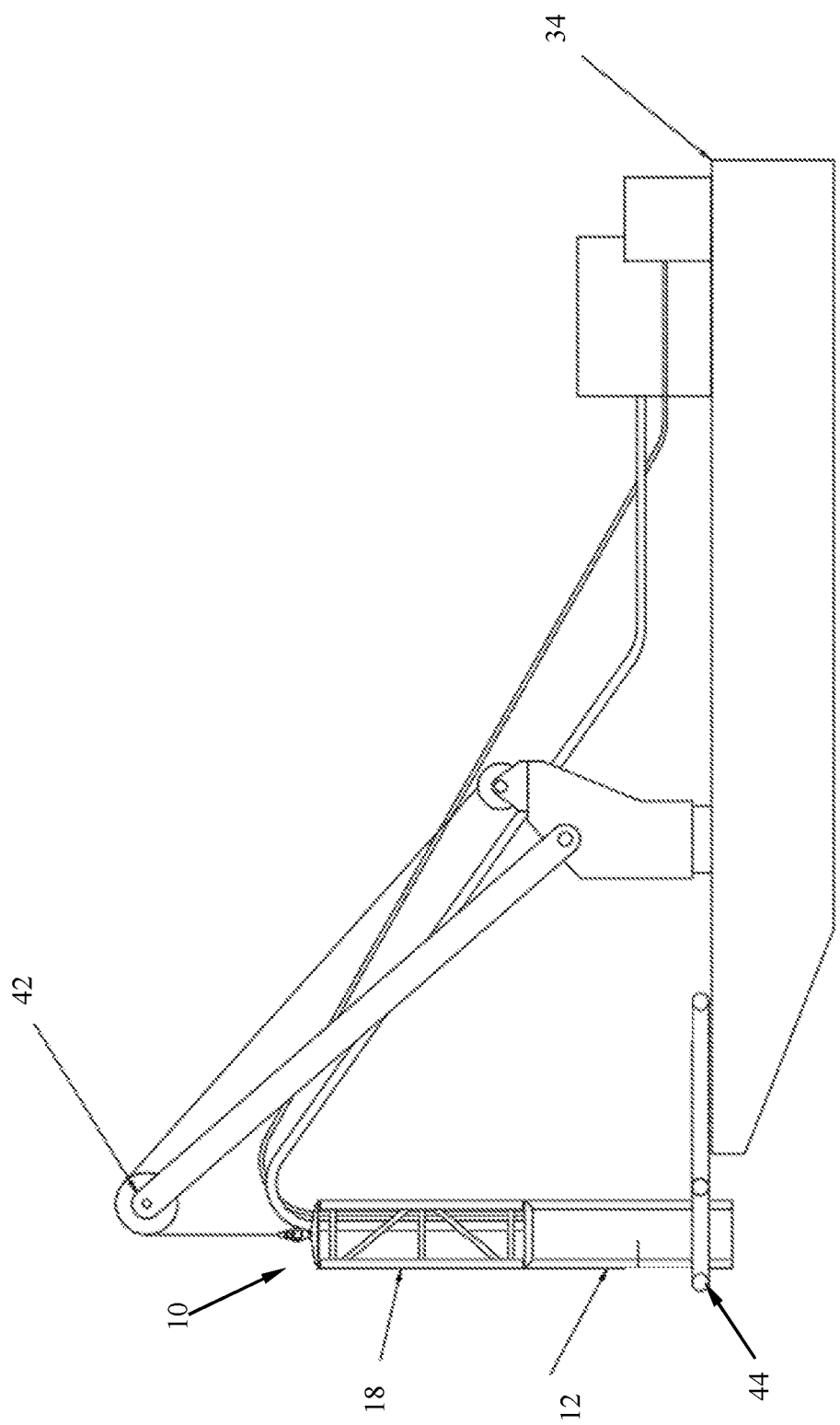
FIG. 8 illustrates the hydraulic excavation apparatus shown in FIG. 1 deployed with a crane.

Referring to FIG. 8, the hydraulic excavation apparatus 10 may also be deployed from a crane 42 or similar device mounted on the floating vessel 34, so that the gantry 36 (shown in FIGS. 5-7) is not required. Movement of the enclosure wall 12 and/or the guide frame 18 may be constrained using a bracket 44 mounted to the floating vessel 34.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A system for excavating soil around and above a pipeline buried under shallow water, the system comprising:
    a hydraulic excavation apparatus including:
        an enclosure wall having an inverted-U cutout at a bottom of each of two opposite portions of the enclosure wall;
        water jetting pipes; and
        hydraulic evacuation pipes;
    a floating vessel including:
        a hoisting system configured to lower and raise the hydraulic excavation apparatus through a retainer mounted on the floating vessel, wherein the hydraulic excavation apparatus passes through the retainer;
        a pressure jetting pump configured to fluidize soil by generating pressure jets at ends of the water jetting pipes; and
        a dredging pump configured to evacuate fluidized soil from inside the enclosure wall through the hydraulic evacuation pipes.

2. The system of claim 1, wherein the hydraulic excavation apparatus further includes a guide frame extending from the enclosure wall.

3. The system of claim 2, wherein the retainer is capable of constraining the movement of the guide frame and maintaining the guide frame vertically.

4. The system of claim 1, wherein the retainer is mounted on the floating vessel via a tilting mechanism.

5. The system of claim 1, wherein the retainer includes a self-erecting gantry or a rectangular bracket.

6. A method for excavating soil around and above a pipeline buried under shallow water, the method comprising:
    providing a hydraulic excavation apparatus including:
        an enclosure wall having an inverted-U cutout at a bottom of each of two opposite portions of the enclosure wall;
        a guide frame extending from the enclosure wall to a level above water;
        water jetting pipes; and
        hydraulic evacuation pipes;
    lowering and raising the hydraulic excavation apparatus;
    fluidizing soil by generating with a pressure jetting pump pressure jets at ends of the water jetting pipes; and
    evacuating with a dredging pump fluidized soil from inside the enclosure wall through the hydraulic evacuation pipes.

7. The method of claim 6, wherein the hydraulic excavation apparatus passes through a retainer mounted on a floating vessel and is lowered and raised through the retainer mounted on the floating vessel, the method further comprising constraining a movement of the guide frame and maintaining the guide frame vertically with the retainer.

8. The method of claim 6, further comprising reducing an amount of soil that enters the enclosure wall by fitting the inverted-U cutout closely around the pipeline.

9. The method of claim 6, wherein the inverted-U cutout is formed in a panel releasably secured to a portion of the enclosure wall attached to the guide frame.

10. The method of claim 6, wherein the inverted-U cutout includes a circular portion that closely fits around the pipeline.

11. A method for excavating soil around and above a pipeline buried under shallow water, the method comprising:
    providing a hydraulic excavation apparatus including:
        an enclosure wall having an inverted-U cutout at a bottom of each of two opposite portions of the enclosure wall;
        a guide frame extending above a top of the enclosure wall;
        water jetting pipes; and
        hydraulic evacuation pipes;
    lowering and raising the hydraulic excavation apparatus;
    fluidizing soil by generating with a pressure jetting pump pressure jets at ends of the water jetting pipes;
    evacuating with a dredging pump fluidized soil from inside the enclosure wall through the hydraulic evacuation pipe; and
    effecting an electrical connection between an electromechanical clamp and the pipeline.

12. A hydraulic excavation apparatus including:
    an enclosure wall having an inverted-U cutout at a bottom of each of two opposite portions of the enclosure wall;
    a guide frame extending from the enclosure wall;
    water jetting pipes, each water jetting pipe having an end located adjacent to a bottom end of the enclosure wall, each water jetting pipe being terminated by a first water jet nozzle; and
    hydraulic evacuation pipes, each hydraulic evacuation pipe including a port that is positioned near a bottom end of the enclosure wall,
    wherein the inverted-U cutout is formed in a panel releasably secured to a portion of the enclosure wall attached to the guide frame.

13. The hydraulic excavation apparatus of claim 12, wherein at least one water jetting pipe further includes a second water jet nozzle located along the at least one water jetting pipe and configured to generate a pressure jet directed essentially horizontally, and wherein the first water jet nozzle is configured to generate a pressure jet directed essentially vertically.

14. The hydraulic excavation apparatus of claim 12, wherein the end of each water jetting pipe is located inside the enclosure wall and above the bottom end of the enclosure wall, and wherein the port of each hydraulic evacuation pipe is located inside the enclosure wall and above the bottom end of the enclosure wall.

* * * * *